US008825677B2

(12) United States Patent
Gausebeck et al.

(10) Patent No.: US 8,825,677 B2
(45) Date of Patent: Sep. 2, 2014

(54) LISTING GENERATION UTILIZING CATALOG INFORMATION

(75) Inventors: David Gausebeck, Mountain View, CA (US); Kuo-Yee Richard Lee, Palo Alto, CA (US); Brian Andrew Phillips, San Francisco, CA (US); Vishwanath Shastry, Palo Alto, CA (US); Katherine Woo, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 11/524,061

(22) Filed: Sep. 20, 2006

(65) Prior Publication Data

US 2008/0077504 A1 Mar. 27, 2008

(51) Int. Cl.
*G06F 17/30* (2006.01)

(52) U.S. Cl.
USPC ............ 707/754; 707/732; 707/737; 707/748

(58) Field of Classification Search
USPC ........................................................ 707/3
See application file for complete search history.

(56) References Cited

U.S. PATENT DOCUMENTS

| 5,724,521 | A | 3/1998 | Dedrick |
| 5,848,396 | A | 12/1998 | Gerace |
| 6,343,274 | B1 | 1/2002 | McCollom et al. |
| 6,985,882 | B1 | 1/2006 | Del Sesto |
| 7,031,932 | B1 | 4/2006 | Lipsky et al. |
| 7,035,812 | B2 | 4/2006 | Meisel et al. |
| 7,039,594 | B1 | 5/2006 | Gersting |
| 7,039,599 | B2 | 5/2006 | Merriman et al. |
| 7,082,426 | B2 * | 7/2006 | Musgrove et al. ................. 707/3 |
| 7,158,943 | B2 * | 1/2007 | van der Riet ............... 705/14.41 |
| 7,630,986 | B1 | 12/2009 | Herz et al. |
| 7,653,568 | B2 * | 1/2010 | Keller et al. ................. 705/7.29 |
| 2002/0035536 | A1 * | 3/2002 | Gellman ......................... 705/37 |
| 2002/0087412 | A1 | 7/2002 | Wood |
| 2002/0103698 | A1 | 8/2002 | Cantrell |
| 2002/0103700 | A1 * | 8/2002 | Gathy ............................. 705/14 |
| 2002/0116257 | A1 * | 8/2002 | Helbig ............................ 705/14 |
| 2003/0041050 | A1 | 2/2003 | Smith et al. |
| 2003/0088463 | A1 * | 5/2003 | Kanevsky et al. .............. 705/14 |
| 2003/0220830 | A1 | 11/2003 | Myr |
| 2005/0033683 | A1 * | 2/2005 | Sacco et al. ..................... 705/37 |
| 2005/0080674 | A1 * | 4/2005 | Howard ......................... 705/14 |
| 2006/0020523 | A1 * | 1/2006 | Song .............................. 705/27 |
| 2006/0293921 | A1 * | 12/2006 | McCarthy et al. ................ 705/2 |

(Continued)

FOREIGN PATENT DOCUMENTS

WO WO-2008036240 A1 3/2008

OTHER PUBLICATIONS

Nentwich et al., "xlinkit: A Consistency Checking and Smart Link Generation Service," ACM, 2002.*

(Continued)

*Primary Examiner* — Mohammad S Rostami
(74) *Attorney, Agent, or Firm* — Schwegman Lundberg & Woessner, P.A.

(57) ABSTRACT

This document describes, among other things, systems and methods for generating advertising campaigns or listings utilizing catalog information. A method comprises receiving, by an online publication system, a product catalog; accessing, by the online publication system, a merchant profile; and using the product catalog and the merchant profile to develop advertising data, wherein the advertising data includes at least one of an advertising campaign, a marketplace listing, or a store listing.

18 Claims, 6 Drawing Sheets

(56) References Cited

U.S. PATENT DOCUMENTS

| | | | |
|---|---|---|---|
| 2007/0027754 A1* | 2/2007 | Collins et al. | 705/14 |
| 2007/0038931 A1* | 2/2007 | Allaire et al. | 715/526 |
| 2007/0073585 A1* | 3/2007 | Apple et al. | 705/14 |
| 2007/0094076 A1 | 4/2007 | Perkowski et al. | |
| 2007/0101362 A1* | 5/2007 | Spielman et al. | 725/37 |
| 2007/0101365 A1* | 5/2007 | Clark et al. | 725/38 |
| 2007/0112656 A1* | 5/2007 | Howe et al. | 705/35 |
| 2007/0157229 A1* | 7/2007 | Heathcock | 725/34 |
| 2007/0219865 A1* | 9/2007 | Leining | 705/14 |
| 2007/0233556 A1 | 10/2007 | Koningstein | |
| 2007/0288312 A1* | 12/2007 | Wang | 705/14 |
| 2008/0082415 A1 | 4/2008 | Shastry | |

OTHER PUBLICATIONS

"International Application Serial No. PCT/US2007/020152, International Search Report mailed Feb. 1, 2008".

"U.S. Appl. No. 11/614,892, Final Office Action mailed Nov. 29, 2010", 12 pgs.

"U.S. Appl. No. 11/614,892, Non-Final Office Action mailed Apr. 15, 2010", 20 pgs.

"U.S. Appl. No. 11/614,892, Response filed Jul. 14, 2010 to Non Final Office Action mailed Apr. 15, 2010", 11 pgs.

"U.S. Appl. No. 11/614,892, Response filed Feb. 28, 2011 to Final Office Action mailed Nov. 29, 2010", 11 pgs.

"U.S. Appl. No. 11/614,892, Non Final Office Action mailed Oct. 2, 2013", 17 pgs.

"U.S. Appl. No. 11/614,892, Response filed Feb. 3, 2014 to Non Final Office Action mailed Oct. 2, 2013", 14 pgs.

"International Application Serial No. PCT/US2007/020152, International Preliminary Report on Patentability Apr. 2, 2009", 2 pgs.

"International Application Serial No. PCT/US2007/020152, Written Opinion mailed Feb. 1, 2008", 6 pgs.

\* cited by examiner

LISTING GENERATION UTILIZING CATALOG INFORMATION

TECHNICAL FIELD

Embodiments relate generally to the field of automated publication, and more specifically to methods and systems that utilize catalogue information to automatically generate listings (e.g., advertisement listings, auction listings, fixed-price listings, and store listings).

BACKGROUND

Advertising is a cornerstone of practically any business. Advertising campaigns can be expensive endeavors and as such, merchants and businesses must carefully evaluate various factors of an advertising campaign to extract the most value. In some cases, a bad advertising campaign can be more costly than if the business had not advertised at all. With the advent of the Internet, new ways to advertise, different market models, and new pricing models add to the already difficult task of designing and implementing an effective and efficient advertising campaign.

DETAILED DESCRIPTION

Methods and systems to manage advertising campaigns, listings, and storefronts are described. In the following description, for purposes of explanation, numerous specific details are set forth in order to provide a thorough understanding of embodiments of the inventive subject matter. It will be evident, however, to one skilled in the art that embodiments of the inventive subject matter may be practiced without these specific details.

Figure 1:
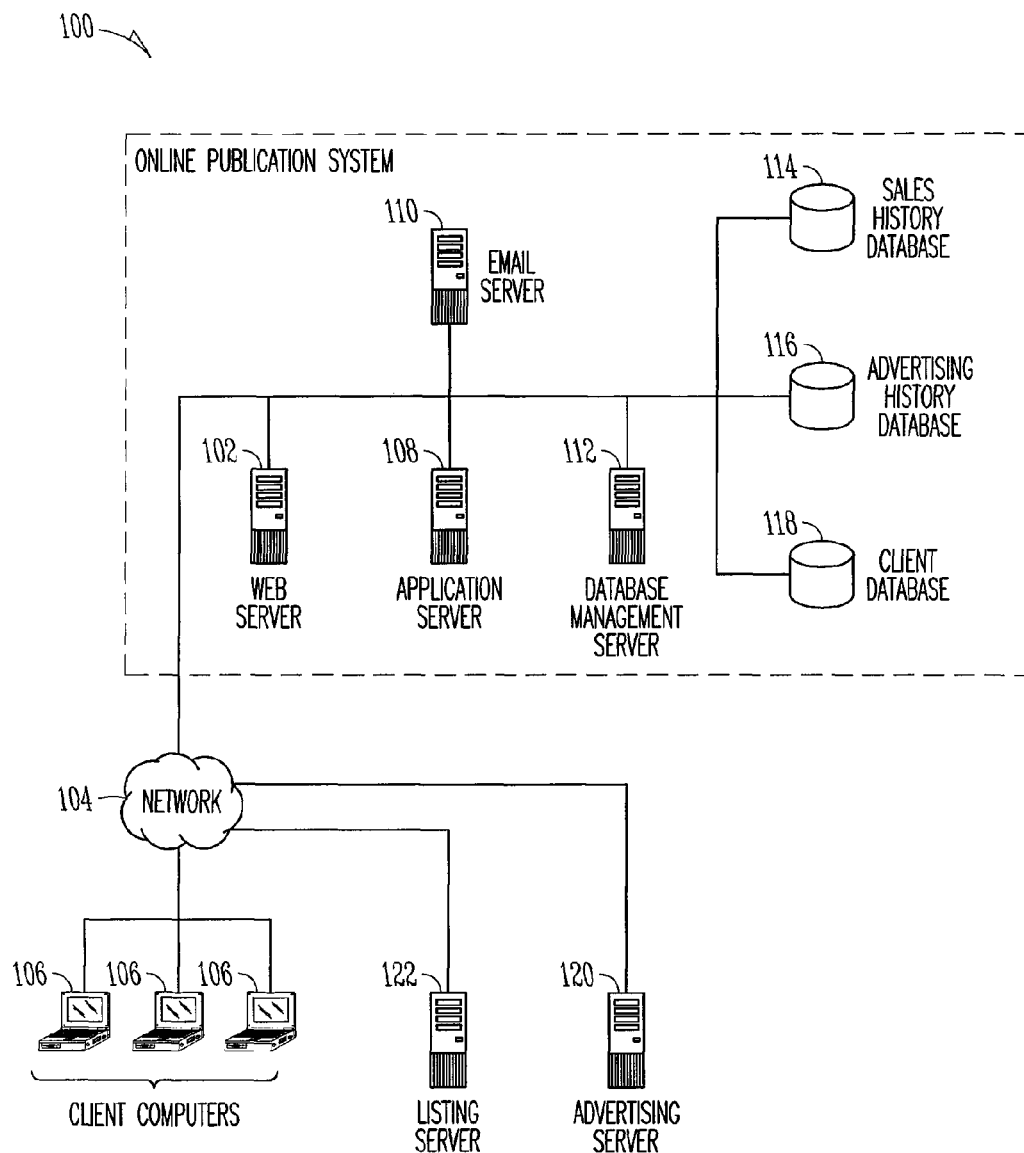
FIG. 1 is a schematic block diagram illustrating an online publication system in accordance with an example embodiment.

FIG. 1 is a schematic block diagram illustrating an online publication system 100 (e.g., an advertising system) in accordance with an example embodiment. While example embodiments of the inventive subject matter are described within the context of the online publication system 100, embodiments of the inventive subject matter may find application in many different types of computer-based or network-based facilities or systems. Accordingly, the example embodiment of an online publication system 100 is not intended to limit the scope of the inventive subject matter solely to such systems.

In an embodiment, the online publication system 100 includes a web server 102, which can communicate over a network 104 to a client computer 106. The web server 102 additionally can communicate using one or more direct or networked connections with other servers, such as an application server 108, an email server 110, and a database management server 112. In addition, a sales history database 114, an advertising history database 116, and a client database 118 are communicatively coupled to the network 104.

In an embodiment, the online publication system 100 is accessed by a client program, for example a browser (e.g., Internet Explorer distributed by Microsoft Corp. of Redmond, Wash.) that executes on the client computer 106 and accesses the online publication system 100 via the network 104. In various embodiments, the network 104 may include the Internet, a wide area network (WAN), a local area network (LAN), a wireless network (e.g., a cellular network), the Public Switched Telephone Network (PSTN) network, or the like.

In some embodiments, the sales history database 114, the advertising history database 116, and the client database 118 are located on the same database server (not shown). In an embodiment, any one of the databases 114, 116, 118 may be configured as distributed databases. In an alternative embodiment, the databases 114, 116, 118 may be implemented as collections of objects in an object-oriented database. In addition, some of the information contained in one database may also exist in another database, for example by using shared tables, automation, or the like. The databases 114, 116, 118 can, in some embodiments, be implemented as relational databases, and can include a number of tables having entries, or records, that are linked by indices and keys relating tables or records within one database or across several databases. In some embodiments, one or more of the databases 114, 116, 118 may be implemented as a collection of data in any format. In an embodiment, one or more of the databases 114, 116, 118 can be hosted by a licensor and one or more licensees.

In an embodiment, the sales history database 114 contains information in one or more tables related to the sale of a client's products or services. For example, the sales history database 114 may be structured to include some or all of the following information: a product identifier, a time and date of sale, a time and date of an initial offering of sale, a purchasing party, a sale price, a wholesale price, a quantity, a channel, a source advertisement, a promotion code, or a profit margin. Additional information may be captured as necessary. The channel may indicate how the product or service was purchased, how the product or service was obtained (e.g., delivery method), or both.

In an embodiment, the advertising history database 116 contains information in one or more tables related to the number, types, and results of advertising with respect to a product, service, or client. For example, the advertising history database 116 may be structured to include some or all of the following information: an ad type, an ad cost, a maximum bid, a number of impressions, a number of clickthroughs, a number of purchases, a starting date, a product identifier, a date of purchases, clickthroughs, or impressions, or a return on advertising investment (e.g., the cost of the ad versus the amount of profit from the campaign). Depending on the level of statistical detail sought, in alternative embodiments, more information is recorded and used in the advertising history database 116.

In some embodiments, the client database 118 contains information about a user (e.g., client) of the online publication system 100. Particular client information may be retained in the client database 118, including but not limited to, a client name, a client type, contact information, an advertising budget, a primary market, a secondary market, and billing information. In some embodiments, additional information may be provided by the client to further help direct and focus the marketing campaign. For example, the client may provide a desired profit amount, margin, or return on ad investment, which the online publication system 100 can use to adjust the design and structure of the advertisement or marketing campaign to optimize a client's preferred metric (e.g., profit margin or return on ad investment). As another example, the client may wish to focus on brand awareness and provide inputs of factors such as estimated audience reach, estimated impressions delivered, measured brand recall (e.g., from surveys, focus groups, etc.), sales lift in a particular region or country, or the like. In addition, the client database 118 may also contain a subset of the client's inventory and related information, which may act as a working or active copy of a product database, in some embodiments. For example, details for products that are being advertised are maintained in the client database, where the number of products advertised is a subset of all of the client's products.

The client database 118 may be populated automatically or manually. For example, in an embodiment, to automatically populate the client database 118, a client user may connect to the online publication system 100 and upload a product database using an application served from the application server 108. In some examples, a Java, ISAPI or other CGI application is provided by the online publication system as an interface. The product database may be formatted using a standardized interface language or in a standard format file. For example, the product database can be formatted using eXtensible Markup Language (XML) or with a common file format, such as comma-separated values (csv) or a tab delimited format. In some examples, the product database may be imported using a database-to-database transfer, such as by using Microsoft SQL Server's Data Transformation Services (DTS) or a backup and restore process. In other embodiments, a user client can create, modify, and manage inventory data manually, for example, by using a user interface provided by the web server 102. In various embodiments, the product database contains data (e.g., UPC, title, manufacturer, description, price, model number, etc.), which can then be integrated into the client database 118.

In an embodiment, a user at a client machine 106 can upload one or more product databases, provide account information, and initiate a process on the online publication system 100 that generates an advertising campaign, listings, or a storefront. In an embodiment, the online publication system 100 may interface with an external advertising server 120 to obtain and provision advertising related to the advertising campaign. In an embodiment, the online publication system 100 may interface with an external listing server 122 to place listings, which may serve to advertise a product or service and also enable customers to purchase such products or services. In various embodiments, the external listing server 122 is part of a larger system, such as an online auction system or an online store.

Figure 2:
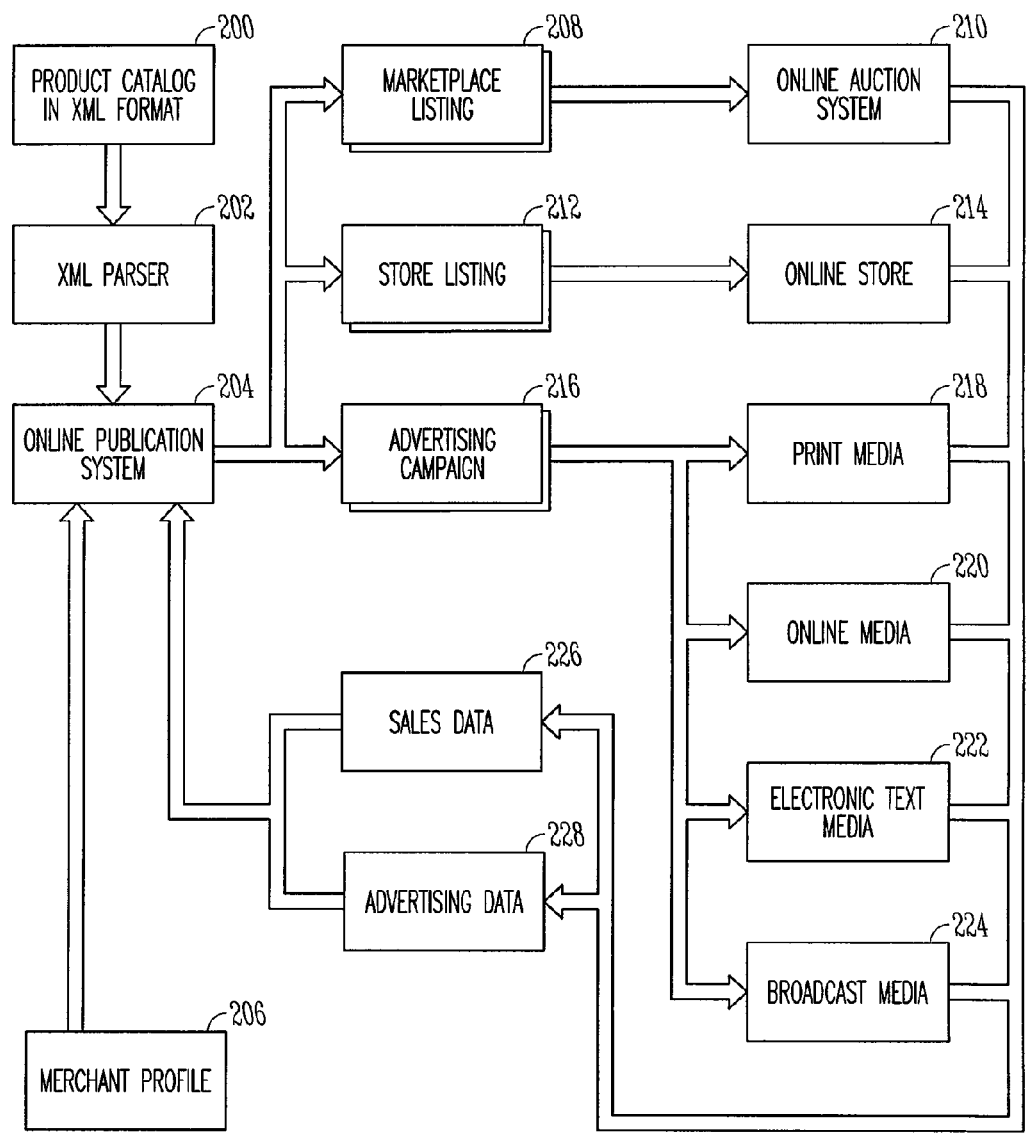
FIG. 2 is a dataflow diagram illustrating portions of the online publication system in accordance with an example embodiment.

FIG. 2 is a dataflow diagram illustrating portions of the online publication system in accordance with an example embodiment. In this example, a product catalog 200 is provided in XML format. An XML parser 202 receives the product catalog 200 and communicates the parsed data to the online publication system 204. The online publication system 204 may include one or more databases similar to those described above, see FIG. 1. In addition to the product catalog 200, the online publication system 204 also receives a merchant profile 206. The merchant profile 206 may include information such as a merchant's advertising budget, billing information, security information (to securely access the online publication system 204), and other merchant preferences. Using this information, the online publication system 204 determines an advertising and marketing plan.

In an embodiment, the online publication system 204 obtains one or more marketplace listings 208 on the merchant's behalf. A marketplace listing may include information such as a title, price, byline, quantity, reserve price, shipping information, and description. In an embodiment, marketplace listings 208 are placed on an online auction system 210, such as eBay's Marketplace. The online auction system 210 may be associated with the online publication system 204, for example, by having a common provider (e.g., eBay). Depending on factors, such as the merchant's budget, quantity available, preferred margin, timeline constraints, or other preferences, a marketplace listing 208 may be created as a fixed price sale, a standard auction, or a Dutch auction.

Figure 3:
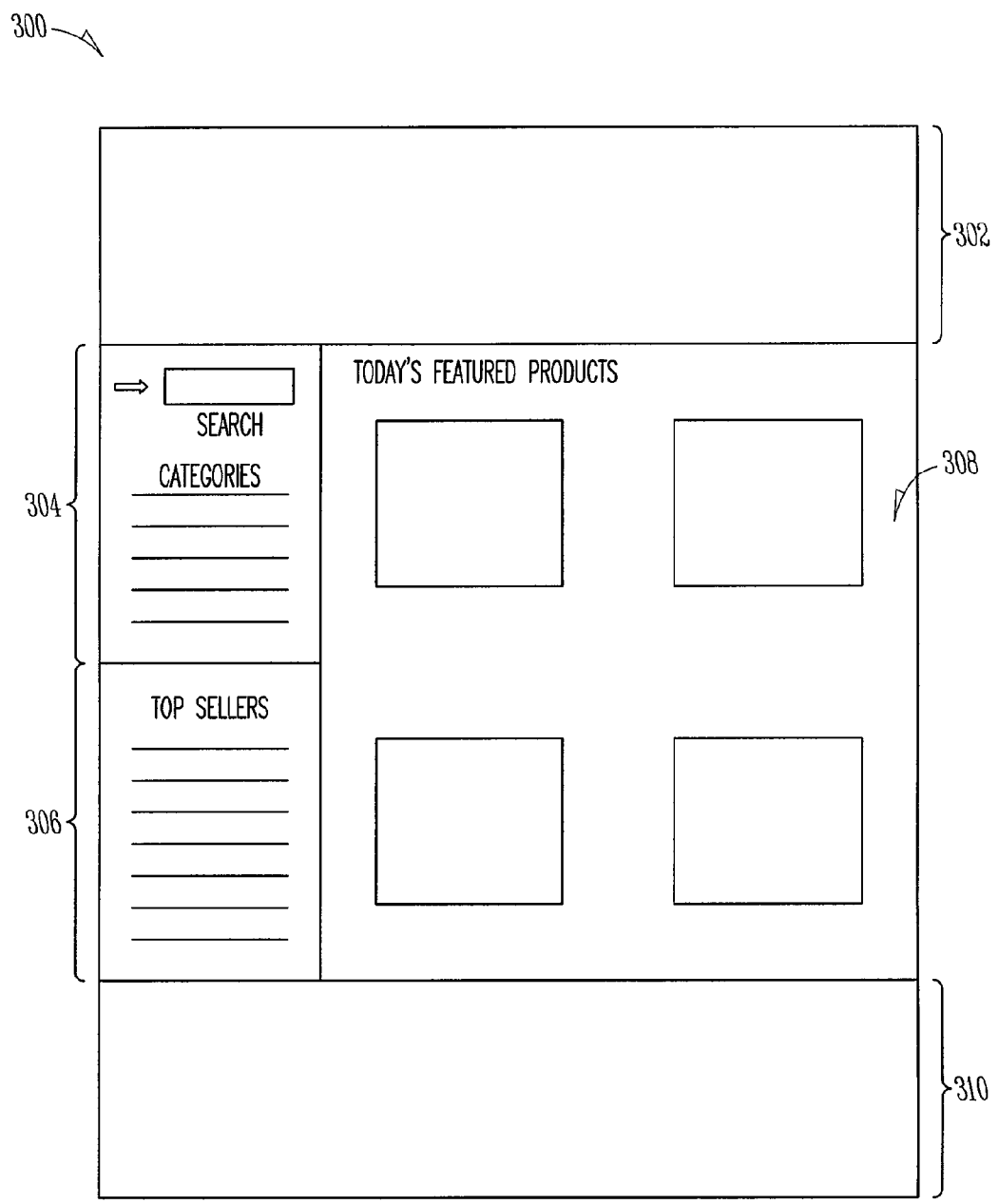
FIG. 3 is an illustration of an online storefront in accordance with an example embodiment.

In an embodiment, the online publication system 204 develops one or more store listings 212. A store listing 212 may comprise a product listing in an online store, in an embodiment. Alternatively, the store listing 212 can comprise some or all of a storefront (e.g., an online store's homepage). FIG. 3 is an illustration of an online storefront 300 in accordance with an example embodiment. The online storefront 300 is composed of a title area 302, a navigation sidebar 304, an advertising sidebar 306, a body 308, and a footer 310. In this example, the advertising sidebar 306 contains information about "Top Sellers" and may be generated by the online publication system 204 using sales data 226 or advertising data 228 (discussed in more detail below). Also in this example, the body contains "Featured Items," which may be chosen based on factors such as available inventory, seasonality, a store user's preferences, sales data 226 (to highlight best sellers), advertising data 228 (to highlight more heavily advertised products or services), or the like. For example, a merchant using a storefront may use Featured Items to drive users to particular products or to entice a user based on previous browsing or purchase history. After determining and developing the store listings 212, the online publication system 204 forwards the information to an online store 214. The online store 214 may be associated with the online publication system 204, for example, by having a common provider (e.g., eBay).

In an embodiment, the online publication system 204 develops one or more advertising campaigns 216. In an embodiment, there are two aspects to an advertising campaign 216: its center of focus and the communication channels used. In one embodiment, an advertising campaign 216 may have a center of focus on a merchant or alternatively, on a particular product or service. In such an embodiment, if the advertising campaign's center of focus is the merchant or a merchant's brand, then advertisements (e.g., print ads, search results ads, emails) may emphasize the merchant's identity, for example by prominently displaying a logo, instead of the particular products the merchant produces. On the other hand, if the advertising campaign's center of focus is a product (or service), then in another embodiment, certain adjustments to the advertising campaign 216 may be made to optimize exposure and sales of the product (or service), such as by optimizing for gross profit or "net" profit (e.g., gross profit less returns and chargebacks). In another embodiment, a hybrid advertising campaign emphasizes a merchant's identity in some communication channels while emphasizing a merchant's products in other communication channels. Another possibility, in some embodiments, is optimizing an advertising campaign for the profit of the listing agent (e.g., an online store). For example, when revenue for the listing agent is based on a cost per action (CPA), such as when a client of the listing agent agrees to pay a CPA of 10% of the sale price of any item sold due to an advertisement placed by the agent, then the listing agent may choose to place ads based on the expected revenue from placing a particular ad using a particular channel or mode.

Another aspect of an advertising campaign 216 is the communication channels used, in an embodiment. In the example illustrated in FIG. 2, four communication channels are provided, including a print media channel 218, an online media channel 220, an electronic text media channel 222, and a broadcast media channel 224. Print media channel 218 may include such modes as newspaper ads, magazine ads, flyers, inserts, postcards, billboards, and the like. Online media channel 220 may include such modes as banner ads, static ads, popup ads, multimedia ads, search results ads, text-based advertisements, clickthrough page ads, and the like. Electronic text media channel 222 may include such modes as email newsletters, direct email, text messaging, instant messaging, Short Message Service (SMS) text messages, other mobile messages and the like. Broadcast media channel 224 may include such modes as television, radio, streaming broadcasts, Really Simple Syndication (RSS) feeds, digital video recorder (DVR) advertising, and the like. Digital video recorder advertising may include banner or text ads displayed to a viewer while the view is searching for a television program or browsing other interactive interfaces, such as during playback of a recorded program, or during searching or scanning a recorded program. DVR advertising may also include promotional programming recorded on the viewer's DVR unit based on the viewer's profile, such as by previously viewed or recorded programs, viewing preferences, or other information on file about the viewer (e.g., age, gender, income level, profession, family composition, etc.).

In an embodiment, various methods are used to track the effectiveness of an advertising campaign 216. For example, an offer code or promotional code may be indicated on the advertisement. A consumer, after receiving the advertisement can use the offer code, for example, to receive free shipping, a reduced price, or a limited edition. The use of the offer code can be traced to the source advertisement for tracking purposes. As another example, an offer code is affixed to a hypertext link, for example within an email advertisement or an online advertisement, such as a banner ad. When a person activates the hypertext link, the online publication system 204 can extract the offer code from the hypertext link and record it. As another example, persistent data (e.g., a cookie) can be used to track a shopper's activities. The persistent data may include offer codes, source codes, user identification, or other statistical information. The use of unique offer codes or other source codes based on advertising channels or particular advertisements can offer a wide range of logging and statistical analysis. Source codes, offer codes, promotional codes, and other types of codes or identifiers can be used to track individual advertisements, advertising campaigns 216, merchants, stores, products, or other aspects of online marketing.

In an embodiment, sales data 226 is communicated to the online publication system 204. The sales data 226 may indicate a product identifier, a sale price, an offer code, a quantity, a time and date of sale, and other information used to track sales related to particular advertisements (offers). In various embodiments, the sales data 226 is communicated either real-time (at the time of the sale) or periodically (such as during a daily batch process).

In an embodiment, advertising data 228 is communicated to the online publication system 204. The advertising data 228, in an embodiment, includes some of data found in the sales data 226, for example, an offer code. Other information that may be found in advertising data 228, depending on the communication channel used, include a number of times an advertisement was shown (impressions), a number of click-throughs, a number of resultant purchases, a number of emails mailed, a number of lines or size of print ad, a circulation of a magazine or newspaper, a cost per ad, a cost per impression, a cost per click, a cost per transfer or broadcast, a number or amount of purchases, a number or amount of returns on purchases, a cost per sale (e.g., advertising or manufacturing cost divided by gross or net revenue), a cost per net sale (e.g., gross sales less returns), a cost per profit (e.g., gross margin, direct margin, net margin), and the like.

In an embodiment, the online publication system 204 collects the sales data 226 and the advertising data 228 and uses the data 226, 228 in combination with the merchant's profile 206 to determine adjustments to an existing advertising and marketing plan. For example, on a monthly basis, the online publication system 204 may review sales data 226 and advertising data 228 for the previous month, determine whether sales were sufficient to justify the cost of advertising using a particular channel, and increase or decrease an advertising effort based on the results of the determination. In an embodiment, sales data or advertising data may be exported to one or more other systems, such as an inventory management system, an order management system, a customer support system, a shipping system, or a fulfillment system, to provide a comprehensive sales and marketing system.

Figure 4:
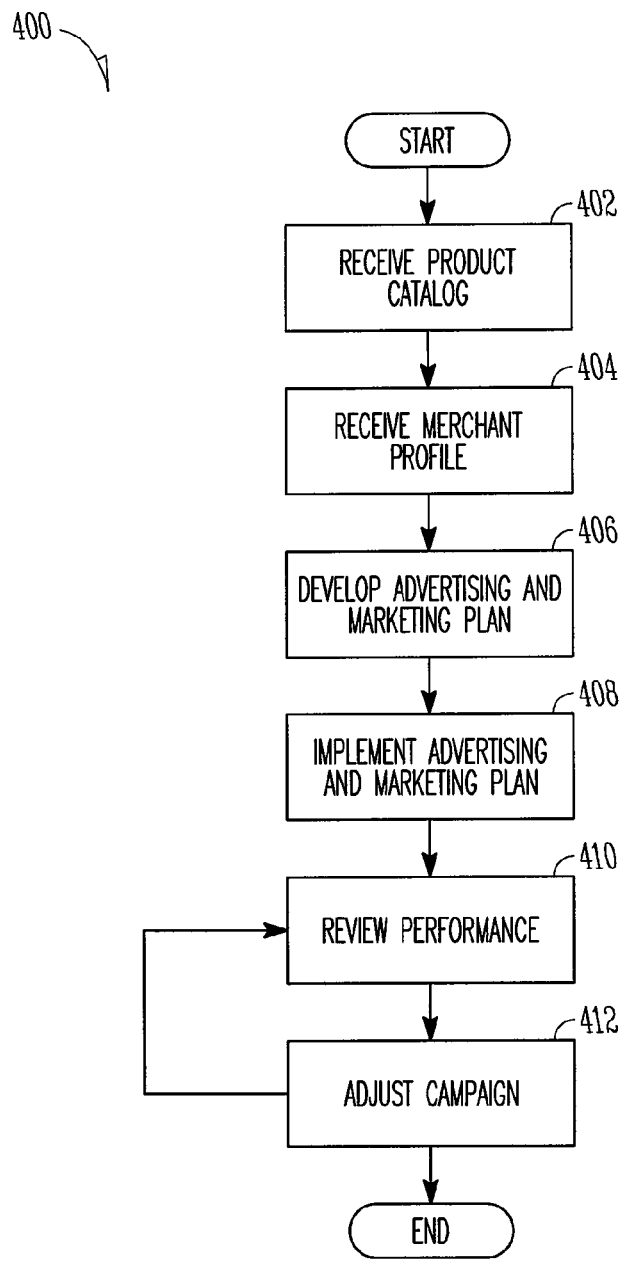
FIG. 4 is a flowchart illustrating a method for generating and managing an advertising campaign in accordance with an example embodiment.

FIG. 4 is a flowchart illustrating a method 400 for generating and managing an advertising campaign in accordance with an example embodiment. The method 400 begins at block 402 by receiving a product catalog. The product catalog may include one or more products and data to distinctly identify the products. In various embodiments, the product catalog is formatted using XML, csv, or other standard file formats to enable the online publication system 204 to efficiently receive and store the product catalog. In another embodiment, the product catalog is transferred using a database-to-database transfer, such as replication or other export-import mechanisms.

At 404, the method 400 receives a merchant profile. In some embodiments, a merchant profile may already be available in the online publication system 204 and at block 404, the method 400 communicates the existing information to a merchant for verification, for example using a verification form (e.g., an HTML page). The merchant can review the information and if the merchant's situation has changed, for example they have a larger or smaller advertising budget, then the method 400 can receive and store such information for later use. If the merchant's profile is not already in the system 204, then a merchant profile creation form, e.g., another HTML page, may be presented to the merchant on his client computer 106 (see FIG. 1), where the HTML page is served from a web server 102.

At 406, the method 400 develops an advertising and marketing plan. In various embodiments, the development of the advertising and marketing plan may range from the very simple to the very complex. For example, in a simple decision making system, only one channel and mode of advertising is used throughout a merchant's product catalog. Such a plan would be simple with respect to the ease of implementation and the ease of analysis after implementation. As an inverse example, a complex decision making system may make multiple calculations using probabilistic models to determine a strategy and plan that may implement different advertising modes or channels for different products in a product catalog in an effort to optimize each advertising campaign for a particular item, product, or product line. A complex advertising and marketing plan may also implement product listings, for example on an online auction system, and further implement corresponding advertising, for example on an online search engine system. Additionally, a complex advertising and marketing plan may include rules that dynamically present an advertisement to a viewer or listener based on the identity or class of the viewer or listener. Such target marketing may be used in one advertising mode or channel or across several modes or channels. One example of developing an advertising and marketing plan is described below.

Figure 5:
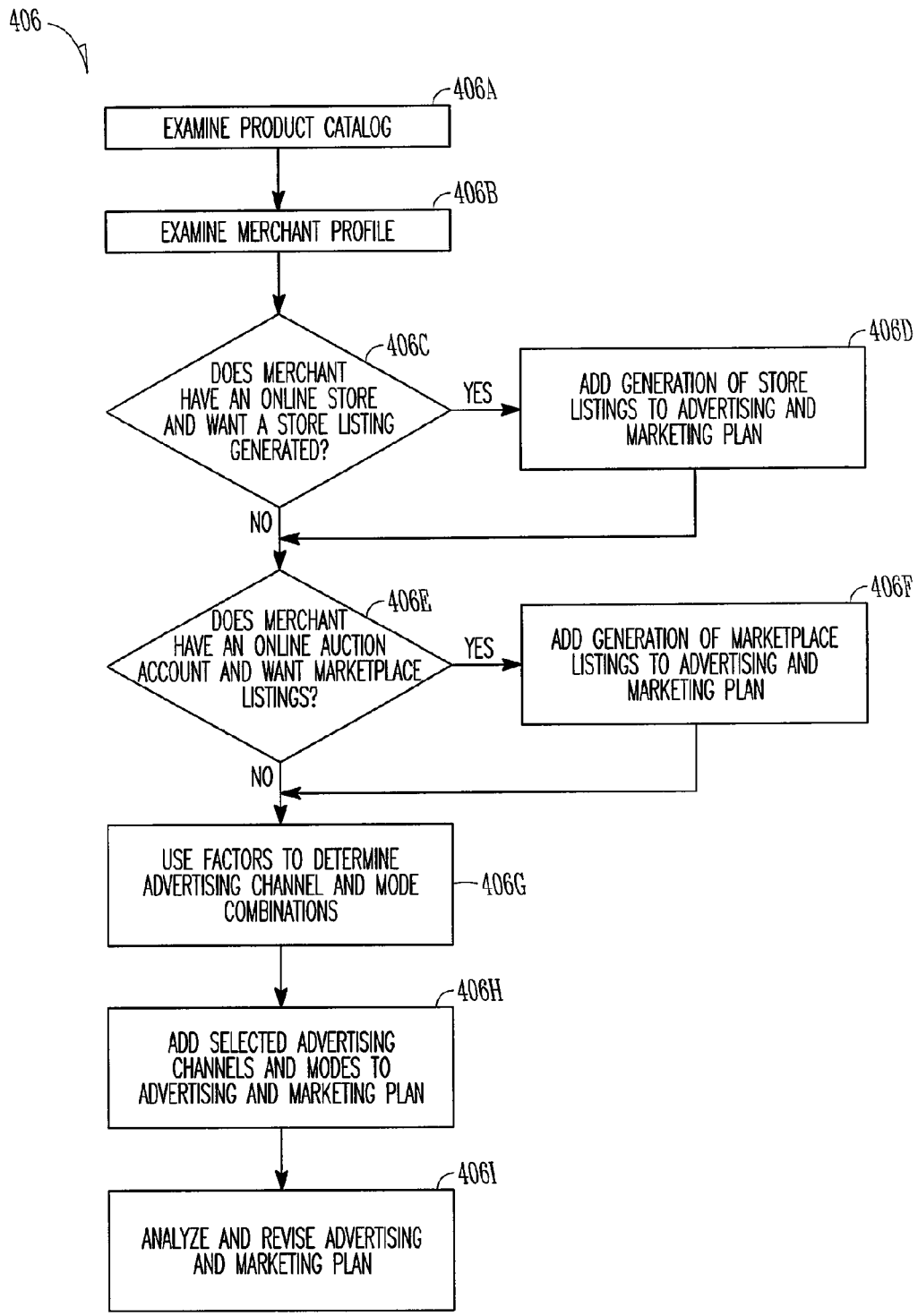
FIG. 5 is a flowchart illustrating a method for determining an advertising and marketing plan in accordance with an example embodiment.

FIG. 5 is a flowchart illustrating a method 406 for determining an advertising and marketing plan in accordance with an example embodiment. At 406A, the product catalog is examined to determine its features or parameters necessary to develop an advertising and marketing plan. For example, the types of products, volume of products, price range of products, and other characteristics may be used in determining the plan.

At 406B, the merchant's profile is examined to determine additional parameters to be used in developing the plan. These additional parameters may include the merchant's advertising budget, shipping ability, preferences, and external account information. The merchant may also provide sales-oriented parameters such as a desired profit amount, margin, or return on ad investment. The merchant may also provide brand-oriented parameters, such as a minimum estimated audience, a target region or country, a minimum estimated delivered impressions, or the like.

External account information may include the merchant's username and password for various advertising or commerce systems. For example, if the merchant was a seller on an online auction system, such as eBay, the merchant's profile may contain the merchant's username and password for eBay. In another example, the merchant may indicate that they have an account, such as on eBay, but may not provide the security information. In some embodiments, it is advantageous if the merchant provides their security information for external systems so that the online publication system 204 may then automatically implement certain advertising and marketing strategies without direct user intervention. In an example, the merchant's profile may contain access mechanisms, such as login tokens or cookies, to secure access to external systems without storing a username or password.

In some embodiments, a merchant may also provide other elections, which may be reflected in the merchant's preference settings in the merchant profile. For example, preferences may reflect a merchant's choice to optimize product unit price or advertising placement using a specific factor, such as a particular advertising channel (e.g., online, print), a sales channel (e.g., online, brick and mortar, drop-ship), sales volume, time period (e.g., a merchant may wish to sell merchandise before a particular season ends or before some other event that could impact sale price or product desirability), or shipping costs. As another example, preferences may reflect the merchant's choice to optimize exposure for increasing brand awareness, such as by using a particular advertising channel, decreasing prices to increase market coverage, or using promotional events.

At 406C, the method 406 determines if the merchant has an online store and whether the merchant has indicated a preference to generate one or more listings for the store. Listings may include permanent listings or more transient listings. Permanent listings may represent a merchant's steady or regular inventory, whereas a transient listing may represent a product in limited quantity or only available for a limited time. Permanent listings may include a number of available inventory remaining, a date of expected new inventory, or the like. To determine whether to generate listings, in an embodiment, the method 406 may examine the merchant's profile to determine the existence of an online store. In some embodiments, a merchant's preference to generate store listings is contained in a corresponding merchant profile.

At 406D, if the merchant has an online store and has indicated a preference to generate listings for the store, then the operation of generating listings for an online store is added to an advertising and marketing plan.

At 406E, the method 406 determines if the merchant has an online auction account and whether the merchant has indicated a preference to generate one or more marketplace listings. In an embodiment, the method 406 can determine whether the merchant has an online auction account by examining the merchant's profile. The merchant's preference to generate marketing listings may be contained in the merchant's profile, in some embodiments.

At 406F, if the method has determined at 406E to generate marketplace listings, then the operation of generating marketplace listings is added to the advertising and marketing plan.

At 406G, the method 406 uses one or more factors to determine one or more advertising channel and mode combinations to add to the advertising and marketing plan. In an embodiment, advertising channels may include print media, online media, electronic text media, and broadcast media. In a further embodiment, advertising modes may include newspaper ads, magazine ads, flyers, inserts, postcards, and billboards or other outdoor advertising for the print media channel; banner ads, static ads, popup ads, multimedia ads, search results ads, text-based ads, and clickthrough page ads for the online media channel; email newsletters, direct email, text messaging, and instant messaging for the electronic text media channel; and television, radio, streaming broadcasts, Really Simple Syndication (RSS) feeds, and digital video recorder (DVR) advertising for the broadcast media channel. In various embodiments, factors may include things such as product types, characteristics of the merchant profile (e.g., advertising budget), and whether an online store listing or a marketplace listing has been added to the advertising and marketing plan. For example, a small advertising budget may preclude advertising using certain broadcast media (e.g., television). Furthermore, in some embodiments, choosing one advertising channel and mode combination may affect the availability or degree of use of other combinations. At 406H, the advertising channel and mode combinations are added to the advertising and marketing plan.

At 406I, the advertising and marketing plan is analyzed and revised. In various embodiments, the advertising and marketing plan is adjusted within the constraints of the merchant profile. For example, the advertising budget may restrict the number of marketplace listings in favor of certain advertising modes or channels. In another example, particular products may receive more or less advertising or listings based on factors such as margin, number of units, and percentage of the merchant's business. In an embodiment, the advertising and marketing plan is stored for future reference, such as a baseline for future adjustments.

Referring to FIG. 4 again, at 408, the advertising and marketing campaign is implemented. Implementation may depend on which strategies were elected and included in the advertising and marketing plan in block 406. For example, if it was determined that a marketplace listing of one or more products should be generated, the method 400 can communicate necessary data to another system, such as an online auction system. In an embodiment, the merchant is provided with the advertising and marketing plan before some or all of the implementation is commenced, so the merchant can consent or modify portions of or all of plan before implementation.

At 410, the method 400 reviews the advertising and marketing campaign. In an embodiment, the review is performed on a periodic basis, for example monthly. The review may also be performed when an event is detected, in some embodiments, such as when a sale is made or an impression of an advertisement is served. In another embodiment, the review is performed when a user, for example the merchant, requests a review. For example, reviews may be periodic, but a merchant may desire to initiate an unscheduled review to accommodate for changing conditions. In a further embodiment, the timing of the review has a default period (e.g., monthly), but can be adjusted by the merchant or other user based on their preference. In an embodiment, the review comprises analyzing the current period's performance against one or more historical performances.

At 412, depending on the results of the review at block 410, one or more adjustments to the marketing and advertising plan may be determined. In an embodiment, the adjustments are implemented automatically by the online publication system 204. In another embodiment, the online publication system 204 may communicate the suggested adjustments to the merchant, for example by using email via the email server 110. In other embodiments, some adjustments may be made automatically with the implied consent of the merchant while other adjustments may require express consent, such as by a responsive action by the merchant.

Figure 6:
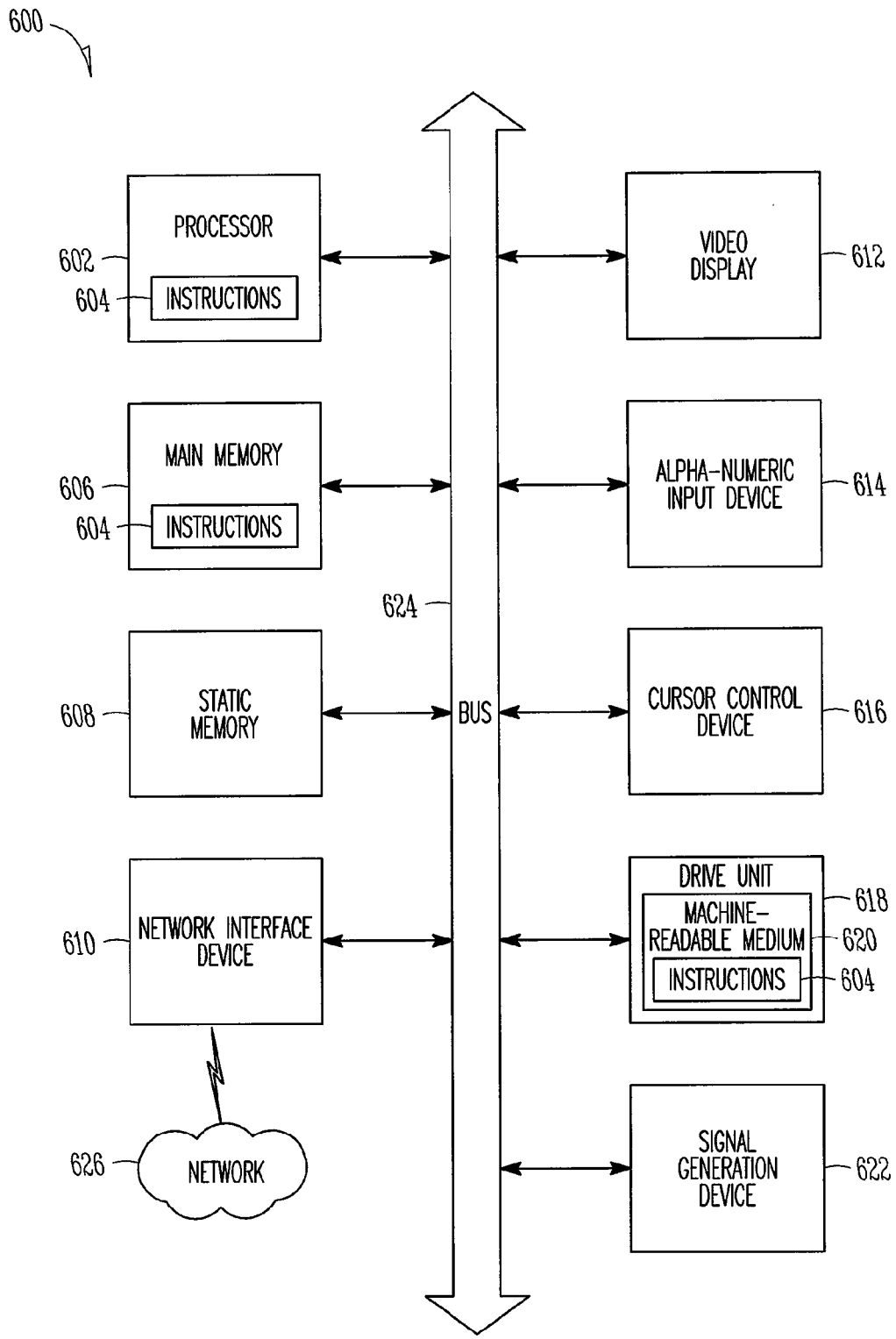
FIG. 6 is a block diagram illustrating a machine in the example form of a computer system, within which a set or sequence of instructions for causing the machine to perform any one of the methodologies discussed herein may be executed.

FIG. 6 is a block diagram illustrating a machine in the example form of a computer system 600, within which a set or sequence of instructions for causing the machine to perform any one of the methodologies discussed herein may be executed. In alternative embodiments, the machine may comprise a computer, a network router, a network switch, a network bridge, Personal Digital Assistant (PDA), a cellular telephone, a web appliance, set-top box (STB) or any machine capable of executing a sequence of instructions that specify actions to be taken by that machine.

The computer system 600 includes a processor 602, a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620 to interface the computer system to a network 622.

The disk drive unit 616 includes a machine-readable medium 624 on which is stored a set of instructions or software 626 embodying any one, or all, of the methodologies described herein. The software 626 is also shown to reside, completely or at least partially, within the main memory 604 and/or within the processor 602. The software 626 may further be transmitted or received via the network interface device 620. For the purposes of this specification, the term "machine-readable medium" shall be taken to include any medium which is capable of storing or encoding a sequence of instructions for execution by the machine and that cause the machine to perform any one of the methodologies of the inventive subject matter. The term "machine-readable medium" shall accordingly be taken to include, but not be limited to, solid-state memories, and optical and magnetic disks. Further, while the software is shown in FIG. 6 to reside within a single device, it will be appreciated that the software could be distributed across multiple machines or storage media, which may include the machine-readable medium.

The foregoing description of specific embodiments reveals the general nature of the inventive subject matter sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

Method embodiments described herein may be computer-implemented. Some embodiments may include computer-readable media encoded with a computer program (e.g., software), which includes instructions operable to cause an electronic device to perform methods of various embodiments. A software implementation (or method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Embodiments of the inventive subject matter may be referred to, individually and/or collectively, herein by the term "inventive subject matter" merely for convenience and without intending to voluntarily limit the scope of this application to any single inventive subject matter or inventive concept if more than one is, in fact, disclosed. It will be recognized that the methods of various embodiments can be combined in practice, either concurrently or in succession. Various permutations and combinations may be readily apparent to those skilled in the art.

What is claimed is:

1. A method comprising:
  receiving, by an online publication system, a product catalog that includes one or more products and data to distinctly identify the products;
  accessing, by the online publication system, a profile of a merchant, the profile including an identity of the merchant and advertising information comprising an advertising constraint;
  using the product catalog and the profile of the merchant to develop advertising data, the advertising data comprising a product listing for a product from the product catalog;

interfacing with a first external system to generate the product listing, the first external system comprising one of an auction system or an online store;

developing, using the advertising data, an advertising campaign and specifying a plurality of communication channels used for the advertising campaign, the advertising campaign to emphasize the merchant's identity in at least one communication channel of the plurality of communication channels and further to emphasize advertising data for products of the merchant in another communication channel of the plurality of communication channels; and analyzing the advertising campaign and, responsive to the reviewing, adjusting the advertising campaign within the advertising constraint.

2. The method of claim 1, wherein the product listing includes at least one of a marketplace listing or a store listing.

3. The method of claim 1, further comprising interfacing with a second external system to place one or more advertisements, wherein the advertisements advertise the product listing.

4. The method of claim 1, wherein the first external system includes the second external system.

5. The method of claim 1, the first external system functioning to place one or more advertisements, wherein the advertisements advertise the product listing.

6. A method comprising:

accessing, by an online publication system, a product catalog that includes one or more products and data to distinctly identify the products;

accessing, by the online publication system, a profile of a merchant, the profile including advertising information comprising an advertising constraint;

using the product catalog and the profile of the merchant to automatically generate advertising data that comprises a product listing for a product in the product catalog and an advertising campaign for the product listing;

interfacing, by the online publication system, with a first external system to generate the product listing, the first external system comprising one of an auction system or an online store, and with a second external system to place one or more advertisements based on the advertising data;

developing, using the advertising data, the advertising campaign and specifying a plurality of communication channels used for the advertising campaign, the advertising campaign to emphasize the merchant's identity in at least one communication channel of the plurality of communication channels and further to emphasize advertising data for products of the merchant in another communication channel of the plurality of communication channels;

determining an efficacy of the advertising campaign; and modifying the advertising campaign to improve the efficacy of the advertising campaign by adjusting the advertising campaign within the advertising constraint.

7. The method of claim 6, wherein the product catalog is formatted using a standardized interface language.

8. The method of claim 7, wherein the standardized interface language is XML.

9. The method of claim 6, wherein the advertising campaign includes one or more of a print advertisement, an internet advertisement, an email advertisement, and a television advertisement.

10. The method of claim 9, wherein the internet advertisement includes a banner advertisement, a search results advertisement, a popup advertisement, or a static advertisement.

11. A computer-readable hardware device including instructions that, when performed by a computer in an online publication system, cause the computer to perform actions comprising:

receive a product catalog that includes one or more products and data to distinctly identify the products;

access a profile of a merchant, the profile including advertising information comprising an advertising constraint;

use the product catalog and the profile of the merchant to develop advertising data, the advertising data comprising a product listing for a product from the product catalog;

interface with a first external system to generate the product listing, the first external system comprising one of an auction system or an online store;

use the advertising data to develop an advertising campaign and specify a plurality of communication channels used for the advertising campaign, the advertising campaign to emphasize the merchant's identity in at least one communication channel of the plurality of communication channels and further to emphasize advertising data for products of the merchant in another communication channel of the plurality of communication channels; and analyze the advertising campaign; and responsive to the review, adjust the advertising campaign within the advertising constraint.

12. The computer-readable hardware device of claim 11, wherein the instructions cause the computer to perform at least one operation comprising interfacing with a second external system to place one or more advertisements, wherein the advertisements advertise the product listing.

13. The computer-readable hardware device of claim 11 wherein the advertising data comprises an advertising campaign, and the instructions cause the computer to:

determine an efficacy of a current advertising campaign; and modify the current advertising campaign using at least one of the product catalog, the profile of the merchant, a sales history, or an advertising history.

14. The computer-readable hardware device of claim 11, wherein the advertising data defines an advertising campaign, and wherein the advertising campaign includes one or more of a print advertisement, an internet advertisement, an email advertisement, and a television advertisement.

15. A network-based publication system, comprising:

at least one server computer;

storage including a first database, the storage communicatively coupled to the server computer, the database includes a profile of a merchant, the profile includes advertising information comprising an advertising constraint;

a second database included in the storage, the second database including a sales history;

a third database included in the storage, the third database including an advertising history;

the at least one server computer being adapted to receive a product catalog that includes one or more products and data to distinctly identify the products, access the profile of the merchant, use the product catalog and the profile to develop advertising data, the advertising data comprising a product listing for a product from the product catalog, and to communicate with an external system to perform one or more of: place an advertisement, generate a marketplace listing, generate a store listing and interface with a first external system to generate the product listing, the first external system comprising one of an auction system or an online store; and at least one computer processor configured to use the advertising data to develop an advertising campaign and specify at least one center of focus of the advertising campaign and a plurality of communication channels used for the advertising campaign, the advertising campaign to emphasize the merchant's identity in at least one communication channel of the plurality of communication channels and further to emphasize advertising data for products of the merchant in another communication channel of the plurality of communication channels analyze the advertising campaign, and adjust the advertising campaign within the advertising constraint.

16. The system of claim 15, wherein the advertising data includes an advertising campaign, and further wherein the server computer is adapted to determine an efficacy of the advertising campaign and modify the advertising campaign to use at least one of the product catalog, the profile of the merchant, the sales history, or the advertising history.

17. A method comprising:

using at least one computer processor of a network-based publication system, receiving a product catalog including one or more products and data to distinctly identify the products;

accessing a profile of a merchant, the profile including advertising information comprising an advertising constraint;

using the product catalog and the profile of a merchant to develop advertising data, the advertising data including at least one of a marketplace listing and a store listing;

interfacing with a first external system to generate the product listing, the first external system comprising one of an auction system or an online store;

developing, using the advertising data, an advertising campaign including a plurality of communication channels used for the advertising campaign, the advertising campaign to emphasize the merchant's identity in at least one communication channel of the plurality of communication channels and emphases advertising data for the merchant's products in another communication channel of the plurality of communication channels; and analyzing the advertising campaign and adjusting the advertising campaign within the advertising constraint of the merchant profile.

18. The method of claim 1, wherein the profile of the merchant comprises at least one of a merchant's advertising budget, a merchant's billing information, a merchant's security access code, and a merchant's advertising preference.

* * * * *